United States Patent
Baer

[15] 3,705,755
[45] Dec. 12, 1972

[54] MICROSCOPY APPARATUS

[72] Inventor: Stephen Charles Baer, 1837 Seminole Avenue, Bronx, N.Y. 10461

[22] Filed: Aug. 24, 1970

[21] Appl. No.: 66,293

[52] U.S. Cl. .................... 350/6, 250/236, 356/203
[51] Int. Cl. .................... G02b 17/00, G02b 21/00
[58] Field of Search .......... 350/6, 285; 356/201, 203; 250/229, 83 HP, 71.5 S, 234, 235, 236; 178/7.6

[56] References Cited

UNITED STATES PATENTS

| | | |
|---|---|---|
| 3,013,467 | 12/1961 | Minsky.................356/201 |
| 3,287,559 | 11/1966 | Barnes..............250/83.3 HP |
| 3,544,200 | 12/1970 | Boll........................350/6 |
| 3,508,051 | 4/1970 | Nichols et al..........250/83.3 HP |

OTHER PUBLICATIONS

Davidovits, 223 Nature 831 (8/1969)

*Primary Examiner*—David Schonberg
*Assistant Examiner*—Robert L. Sherman
*Attorney*—Richard M. Sharkansky

[57] ABSTRACT

Images of areas of selected planes of an object or field to be viewed are provided by apparatus including means for focusing an incident beam of radiation onto a point in the selected plane, a pinhole aperture, means directing radiation emanating from the irradiated point onto said aperture, means synchronously scanning the incident and emanating beams in a raster pattern across said selected plane, means producing a third beam of radiation with an intensity proportional to the intensity of the radiation from said emanating beam directed onto said pinhole aperture, means focusing said third beam upon a point in an image plane, and means scanning said third beam across said image plane in synchronization with the scanning of said irradiated point across said selected plane, to produce an image of said selected plane at said image plane.

11 Claims, 3 Drawing Figures

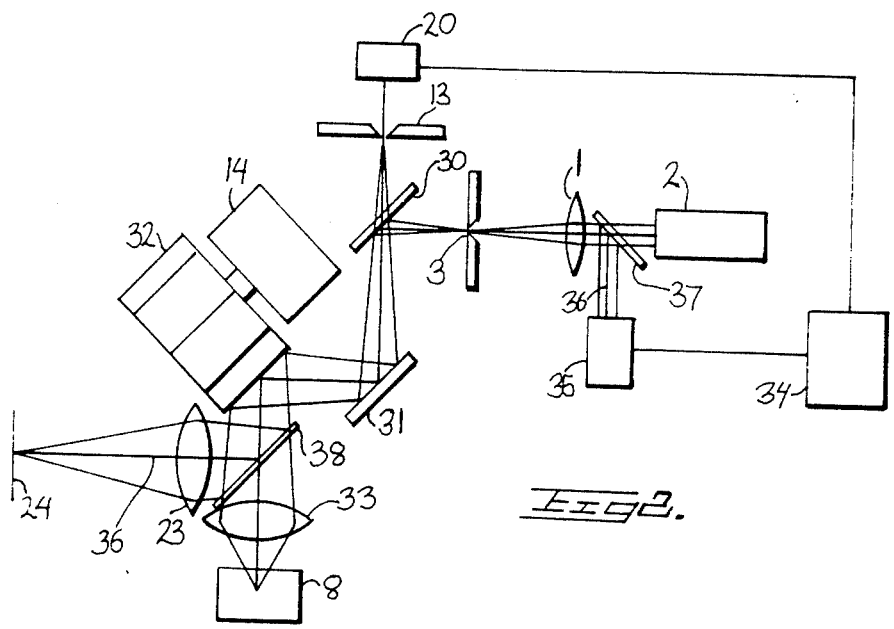
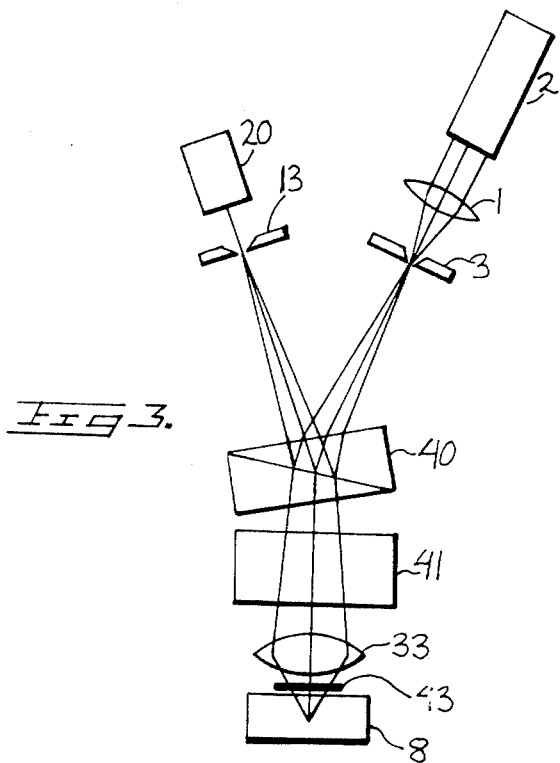

MICROSCOPY APPARATUS

The present invention relates to microscopes, and particularly to certain improvements of an invention of microscopy apparatus by M. Minsky, U.S. Pat. No. 3,013,467. In the Minsky microscope, light from a point source is focused to a point in (though specimen, and light from this specimen point is focused onto a pinhole aperture. Light passing through this aperture falls on a photocell, the output of which modulates the intensity of the spot on a cathode ray tube, which is deflected in synchrony with a two dimensional vibration of the specimen. Two of the objects of the Minsky invention were to (1) allow microscopy of highly scattering specimens by filtering out most of the scattered light not arising from the plane of focus and (2) allowing microscopy at a higher resolving power than the Abbe resolution limit by effectively squaring the light intensity pattern distribution of the diffraction limited image of a point. Another desirable property of the Minsky microscope (through Minsky did not mention this property in his patent) is that if the microscope were used with dark-field, reflected light, or flourescence illumination, effectively only the plane of focus would appear illuminated. Some of the numerous applications and advantages of focal-plane-specific illumination are described in my pending U.S. Pat. application Ser. No. 721,848 now U.S. Pat. No. 3,547,512 issued Dec. 15, 1970, which relates to a microscope which obtains focal-plane-specific illumination by a different method than the Minsky invention and the present invention. The microscopy of specimens such as living biological tissue potentially could benefit greatly from these optical advantages of the Minsky microscope, because often such specimens are thick and highly scattering, and because the method generally used to exceed the light microscope's resolution limitations, electron microscopy, is not suited for such specimens. Also, experience with a prototype of the microscope described in my pending U.S. Pat. application Ser. No. 721,848, has demonstrated that focal-plane-specific illumination is extremely useful for the examination of living biological tissues. However, such non-rigid specimens would be very likely to be distorted or damaged by the specimen vibration required in the Minsky microscope. This is especially true for microscopy of cellular detail in functioning organs of whole animals, where vibration of the specimen would be difficult or impossible.

Accordingly, it is the primary object of the present invention to provide a microscope which retains many of the optical advantages of the Minsky microscope, while allowing the specimen to remain stationary during scanning. Another object of the present invention is to eliminate the problem inherent in the Minsky microscope, of relative movement between the objective lens and the specimen, which could pose technical problems when small-working-distance oil-immersion objective lenses are used. Another object of the invention is to improve the Minsky microscope by making the amplitude of the scanning movement required to produce a given sized visual image independent of the magnification of the objective lens, allowing rapid interchangeability of objective lenses.

Another object of the present invention is to allow scanning to be accomplished by means of a wide variety of available light beam deflecting devices, including nonmechanical electrooptical beam deflecting devices. Another object of the present invention is to incorporate a method of scanning which is adaptable to a novel form of image display, wherein the same scanning element producing scanning of the incident and emanating beams over the specimen also produces scanning of an image forming beam. Such an image display arrangement is intrinsically much simpler than arrangements in which a mechanical scan must be synchronized with the scan of a cathode ray tube, and furthermore, it eliminates the distortion produced in a cathode ray tube type of display when the synchronized mechanical scanning elements contain unwanted degrees of mechanical freedom.

Other objects and features of the present invention will become apparent from the following detailed description when taken in conjunction with the drawings in which:

FIG. 2 is a diagrammatic elevational view of another form of microscope which employs epi-illumination of the specimen;

FIG. 3 is a diagrammatic elevational view of a form of microscope employing a Wollaston prism as beamsplitting means.

Figure 1:
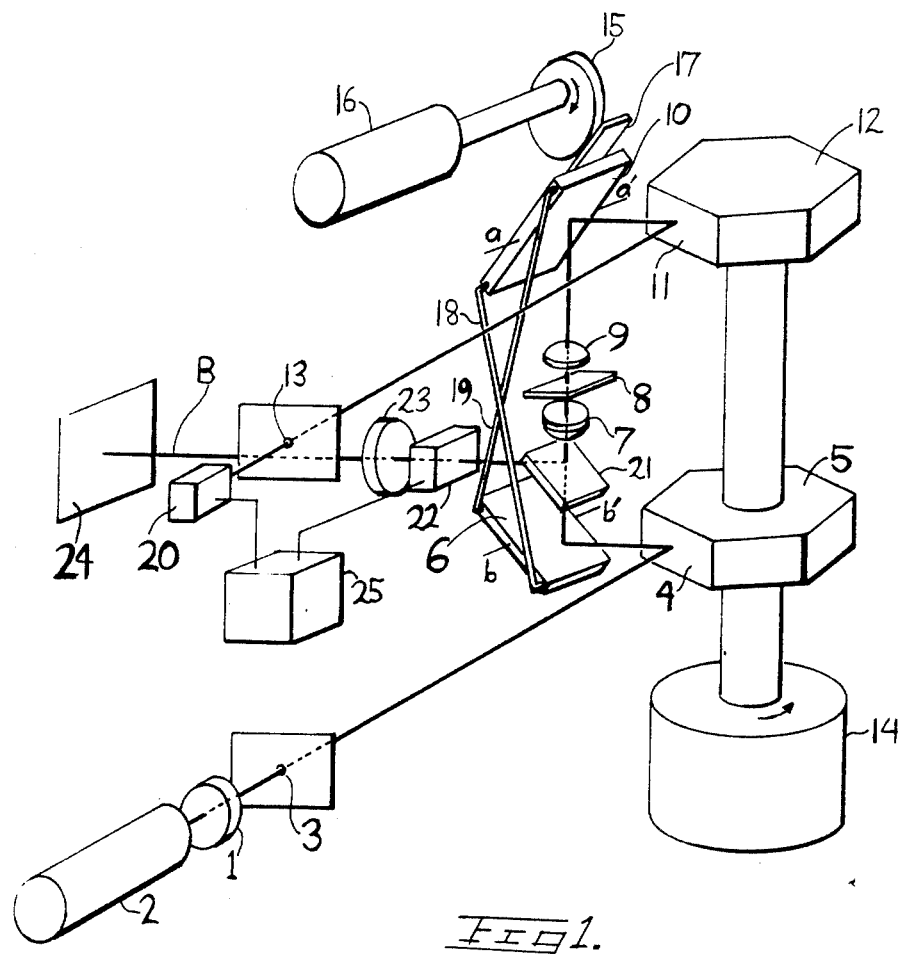
FIG. 1 is a diagrammatic perspective view of a microscope embodying the principles of the invention.

FIG. 1 shows a transillumination embodiment of the invention. Lens 1 focuses the incident light beam, produced by laser 2, onto pinhole aperture 3. The beam diverging from aperture 3 is reflected from mirror 4, (one of six reflecting faces of rotating prism 5), and then reflected from pivoting mirror 6 onto flat-field objective lens 7, which focuses the incident beam to a point in the plane of focus of specimen 8. The divergent light beam emanating from the irradiated point in specimen 8 passes through a second objective lens 9 (having the same magnification as, and mounted on the same axis as lens 7) which focuses it into a convergent beam. After reflection from pivoting mirror 10 and mirror 11 (one of six reflecting faces of rotating prism 12), the emanating beam forms a focus at pinhole aperture 13. Prisms 5 and 12 are concentrically mounted on the shaft of motor 14, symmetrically about a plane passing through the focal plane of the specimen 8. Mirrors 6 and 10, objectives 7 and 9, and pinhole apertures 3 and 13 are likewise symmetrically arranged about that plane. As motor 14 turns, movement of the mirror faces on prism 5 causes the point of convergence of the incident beam in the specimen to repetitively scan over the specimen in say the Y dimension. Movement of the mirror faces of prism 12 causes similar scanning of the beam emanating from the specimen. Because of the symmetry of the optical system, the scan of the emanating beam is always such as to direct onto aperture 13 the radiation from the point in the specimen currently irradiated by the incident beam. Cam 15 is rotated about an eccentric axis by motor 16, and causes cam follower element 17 and attached mirror 10 to oscillate about axis $a-a'$, where mirror 10 is pivotally attached to the framework of the microscope, perhaps by a leafspring pivot (not illustrated). Coupling rods 18 and 19, which are rotatable at their points of attachment with mirrors 10 and 6, cause mirror 6 to oscillate about its mounting axis $b-b'$ as mirror 10 oscillates about its axis $a-a'$, so that symmetry of mirrors 6 and 10 with respect to the plane containing the plane of focus of specimen 8 is preserved as the mirrors oscillate. Oscillation of mirrors 6 and 10 causes the incident beam and emanating beam, respectively, to scan over the specimen in say the X dimension. Again, because of the symmetry of the optical system, the scan of the emanating beam in the X dimension is always such as to direct onto aperture 13 the radiation from the point in the specimen currently irradiated by the incident beam. Light receptive element 20, which may be a photocell, photomultiplier, or photodiode, receives the light passing through pinhole aperture 13, and produces an electrical output proportional to the intensity of that light.

The final image may be displayed on a cathode ray tube oscilloscope (not illustrated), as in the Minsky microscope, where the electrical output of receptor 20 modulates the intensity of the electron beam in the cathode ray tube ("Z-axis modulation"), and the horizontal and vertical deflection of the beam is synchronized with the scanning of the incident and emanating beams over the specimen in the X and Y dimensions. Horizontal deflection input to the oscilloscope may be the output of an angle transducer element (not illustrated) connected to mirror 10, so that the transducer produces an electrical output proportional to the angle of mirror 10. Vertical deflection input to the oscilloscope could be the electrical output of an angle transducer element (not illustrated) connected to a shaft (not illustrated) which was caused to rotate 6 times faster than the shaft of motor 14 by a suitable gear or pulley arrangement. A problem with such a cathode ray tube display is that when a scanning element undergoes spurious vibrations in a dimension other than its intended scanning dimension, the synchronization between the scanning of the incident and emanating beams over the specimen and the scanning of the electron beam over the cathode ray tube is upset. Suppose, for example, that the mirror 6 during scanning in the X dimension, produced a small oscillation in the Y dimension as a result of spurious vibrations. This small oscillation would not be compensated for by a similar oscillation in the Y dimensional deflection of the beam of the cathode ray tube, because the cathode ray tube Y deflection is sensitive only to the position of the intended Y deflecting elements, prisms 5 and 12. If the supports for the pivot points of the scanning elements were rigidly connected to the stationary frame of the microscope, then spurious vibrations could be made negligible. However, in order to avoid transmitting vibration to the frame of the microscope, some sort of flexible coupling of the scanning elements to the microscope is preferred.

An alternate form of image display, by a scanned, intensity-modulated light beam, not only avoids this problem of display synchronization, but is also intrinsically much simpler than a cathode ray tube type of display. Beam splitting plate 21 diverts a portion B of the scanned incident beam to pass through electrooptical light intensity modulator 22 and lens 23. Lens 23 focuses beam B onto a real or virtual point focus at the desired image plane 24. The output from receptor 20 is amplified by amplifier 25, and the amplified signal applied to modulator 22, causing the light transmission of the modulator to be proportional to the light incident on receptor 20. Since the beam B focused onto image plane 24 is derived from the same scanned beam which is focused on the specimen, the position of the illuminated point on plane 24 will correspond exactly to the position of the irradiated point in the specimen. Synchrony in the scanning of beam B with the beam incident on the specimen is insensitive to gross spurious movements of the scanning elements. However, in this transillumination embodiment of the present invention, modes of spurious vibration of the scanning elements which are not symmetrical about the plane of focus of the specimen reduce the synchrony in the scanning between the beam incident onto and the beam emanating from the specimen. Since a rotating type of beam scanner such as prism 5 is intrinsically capable of much faster scanning rate than a reciprocating beam scanner such as mirror 6, the fast scan dimension of the two dimensional raster (the line scan) is chosen as the Y dimension in FIG. 1 and the slow dimension (the frame scan) is chose as the X dimension. If the motor 14 rotated prisms 5 and 12 at 1,000 revolutions per second, then 6,000 lines could be scanned per second, which at 10 frames per second, corresponds to 600 lines per frame. By increasing the number of faces on the prisms the frame rate or the lines per frame could be increased. One advantage of the scanned light beam type of image display is that it lacks the image resolution limitations inherent in cathode ray tubes. For example, if the lenses and other optics of the microscope could resolve 10,000 picture elements per line scan, then assuming sufficient bandwidth of the detector, 20, amplifier 24, and modulator 22, none of this resolution would be lost in the image display. Similarly, images with 10,000 lines per frame could be produced. The quality of the displayed image might be improved by inserting between receptor 20 and modulator 22 image processing means, such as means to differentiate the electrical output of receptor 20, and thereby enhance border detail in the image. Another advantage of the scanned light beam display is that some electrooptical light modulators have a greater contrast ratio than available cathode ray tubes, allowing the image to have a better contrast and tonal range than would be possible with a cathode ray tube display.

The device of FIG. 1 has the same optical properties as the transillumination embodiment of Minsky's microscope, with one exception: the objective lenses in the present invention are required to image points lying off their optical axes. One of the aims of the Minsky invention was to provide a microscope system in which simple objective lenses could be used, as a consequence of the fact that it is much more difficult to design a lens free of aberrations over its entire field of view than just for imaging one axial point. To secure the advantages of scanning by deviation of light beams, this feature of the Minsky invention was sacrificed in the present invention. As a result of the fact that the objective lenses in the present invention must image points lying off their optical axes, they must be well corrected for curvature of field, at least in transillumination embodiments of the present invention. However, in the epiillumination embodiments described below, field curvature correction is not required.

FIG. 2 shows an epiillumination embodiment of the invention. Lens 1 focuses light from laser 3 to converge on pinhole aperture 3. The beam diverging from aperture 3 is successively reflected from beam-splitting plate 30, pivotally mounted mirror 31 and a reflecting face of mirror-faced, rotatable, octagonal prism 32. The incident beam is then focused by microscope objective lens 33 to a point in the plane of focus of specimen 8. The beam emanating from the irradiated point of the specimen travels a reverse path: after passing through objective 33 it is reflected by a face of prism 32 and mirror 31 onto beam-splitting plate 30. The portion of the emanating beam which is transmitted through beam-splitting plate 30 converges to a focus at pinhole aperture 13 which is conjugate to pinhole aperture 31 relative to the reflective surface of beam splitting-plate 30. The point focus of the incident beam is scanned in two dimensions over the plane of focus of the specimen, by the rotation of prism 32 and the pivotal oscillation of mirror 31. Prism 22 is rotated by motor 14, and mirror 21 may be oscillated by means such as the cam arrangement in the device of FIG. 1. Because the beam emanating from the irradiated point in the specimen is scanned by the same elements which scan the incident beam, it is always directed onto pinhole aperture 13, (as long as apertures 13 and 3 remain conjugate to each other). Therefore, no coupling elements are required to synchronize the scanning of the incident and emanating beams. The light passing through pinhole aperture 13 impinges on light detector 20, the output of which, after suitable amplification by amplifier 34, modulates the output light intensity of light-emitting diode 35. The light beam 36 emitted from diode 35, is of a different wavelength from the light beam produced by laser 2. Dichroic mirror 37 is reflecting and non-transmitting for light of the wavelength of beam 36 and transmitting and non-reflecting for light of the wavelength produced by laser 2. Dichroic mirror 37 reflects beam 36 into the path of the beam incident on the specimen and beam 36 follows the incident beam through the scanning means 31 and 32, until it is reflected away from the incident beam by a second dichroic mirror 38 of the same reflection characteristics as mirror 37. Lens 23 images beam 36 on a point in the image plane 24, and since beam 36 is scanned by the same elements which scan the incident and emanating beams over the specimen, scanning of the point of convergence of beam 36 across plane 24 is always exactly synchronized with the scanning of the incident and emanating beams over the specimen. With the embodiment shown in FIG. 2, the laser 2 could produce an incident beam of invisible radiation such as infra-red or ultra-violet, and the image would be of a visible wavelength emitted by light-emitting diode 35.

Another type of image display, which is useable if the laser 2 is sufficiently powerful, is produced by redirecting the light beam which has passed through pinhole aperture 13 back into the scanning elements, so it forms a scanned image. By directing this beam through the scanning elements at a slight angle to the incident and emanating beams, it can be kept segregated from these beams, and still be scanned synchronously with them.

There are many known light beam scanning devices which might replace the vibrating mirror and rotating prism of FIGS. 1 and 2. Laser beams have been deflected by diffraction from ultrasonic waves propaged in suitable media, and such ultrasonic deflection devices perhaps could produce scanning in the present invention. Prisms made of media which change their refractive index with changes in applied electrical fields can be made to scan a beam if sawtooth electrical voltages are applied to them. The advantage of using such electrooptical scanning in the present invention is that all moving parts associated with scanning could be eliminated, and also exceptionally rapid scan rates might be achieved.

When the present invention is applied to the art of electron microscopy, a heated filament or field emission cathode could replace the laser of FIGS. 1 and 2 as a source of radiation, conventional electron-optical lenses could replace the light-optical lenses, and electrostatic or electromagnetic scanning means, known in the art of scanning electron microscopy, could produce the required scanning of the beam incident on and the beam emanating from the specimen.

In the embodiments of the invention described above, the beam splitting means 30 at the optimum reflectivity of 50% wastes 50% of the beam energy during each of the two required transits, not even considering light absorption. Such extensive light wastage may be avoided in embodiments of the invention for fluorescence microscopy, by replacing the beam splitting plate with a dichroic mirror which is completely reflecting at the wavelengths for fluorescent excitation, and completely transmitting at the wavelengths for fluorescent emission. Another method for avoiding light wastage is shown in FIG. 3, where beam "splitting" is accomplished by Wollaston prism 40. Laser 2 emits plane polarized light of a polarization which travels as an extraordinary ray through Wollaston prism 40, with no losses except for absorption and incidental reflections. After passing through prism 40, and scanning means 42, and being focused by objective lens 33, the incident beam passes through quarter-wave plate 44, which converts the beam to circular polarization. Light reflected from the specimen 8 undergoes a reversal in the direction of circular polarization, and therefore on retraversing quarter wave plate 43, it is converted to a linearly polarized beam polarized at right angles to the original beam. This emanating beam therefore travels as an ordinary ray through Wollaston prism 40 and comes to a focus at pinhole aperture 13. The light passing through aperture 13 falls on detector 20, the output of which modulates a scanned electron or light beam as in previously described embodiments. Other devices which differentially reflect or refract beams of orthogonal polarizations could be used in place of the Wollaston prism of FIG. 3.

One of the aims of the Minsky invention and the present invention is to increase resolving power beyond the Abbe resolution limit. McCutchen has calculated that a scanning optical system involving projection of a smallest possible image of a point on a specimen, and in turn imaging the central portion of this point image on a pinhole aperture has twice the resolving power of a system lacking the pinhole aperture. (*J. Optical Soc. Am.* 57:1190(1967)). Another proposed method of exceeding the Abbe resolution limit involves placing an appropriate spatial filter at the pupil of the objective lens. (Born and Wolf, Principles of Optics, 3rd ed., p.416) A shortcomming of this second procedure is that as the diameter of the primary maximum of the Airy disc is reduced, a greater proportion of the light energy is diverted into the higher order maxima, severely reducing image contrast. In the present invention and the Minsky invention, the Airy disc intensity distribution for the illuminating optical system is multiplied at each point by the Airy disc intensity distribution for the viewing optical system to produce the effective Airy disc intensity distribution for the entire system. If, for example, an appropriate aperture is placed in the illuminating optical system to produce a very sharp central maximum, but a one containing a relatively small proportion of the total energy in the image, and such an illumination system is used in the present invention with a conventional objective in the viewing system, multiplication of the two Airy disc distributions should produce a whole-system performance which corresponds to an ideal Airy disc distribution, with both a very narrow diameter of the central maximum and the greatest concentration of energy in the central maximum. It is hoped that by this method, light microscopes of exceptionally high resolving power can be constructed.

I claim:

1. In an image producing microscope wherein an entrance beam of radiation is focused to a small spot in a selected plane of a specimen and an exit beam formed from a portion of the radiation emanating from such small spot is focused to an exit pinhole aperture, the intensity of such exit beam varying in accordance with variations in characteristics of the specimen, and focusing means are provided for focusing a beam of radiation, the intensity thereof being a function of the intensity of the radiation focused to the exit pinhole aperture, to a point in an image plane, the improvement comprising:
   a. means for maintaining the specimen stationary; and,
   b. means for scanning the entrance beam and the exit beam to move the small spot over the stationary specimen in the selected plane while the exit beam remains focused to the exit pinhole aperture, and, synchronously therewith for scanning the beam of radiation focused to the point in the image plane to move such point over such image plane.

2. The improvement recited in claim 1, having, additionally, beam splitting means for causing the entrance beam and the exit beam to be coincident as each one thereof passes between the scanning means and the stationary specimen.

3. The improvement recited in claim 1 including additionally a spatial filter disposed at a point along an optical path, such optical path being defined by the path of the entrance beam and the path of the exit beam.

4. The improvement recited in claim 1 wherein the said focusing means includes means for causing the beam of radiation focused to the point in the image plane to be coincident with the entrance beam at the scanning means.

5. The improvement recited in claim 1 wherein the scanning means includes a reflecting element, such reflecting element being disposed in the path of the entrance beam and the beam of radiation focused to the point in the image plane.

6. The improvement recited in claim 1 wherein the said focusing means includes means for causing the beam of radiation focused to the point in the image plane to be formed from a portion of the radiation of the entrance beam.

7. In an image producing microscope wherein an entrance beam of radiation is focused to a small spot in a selected plane of a specimen and an exit beam, having a central axis, formed from a portion of the radiation emanating from such small spot is focused by an objective lens having an optical axis to an exit pinhole aperture, the intensity of such exit beam varying in accordance with variations in characteristics of the specimen, and, means are provided for focusing a beam of radiation, the intensity thereof being a function of the intensity of radiation focused to the exit pinhole aperture, to a point in an image plane, the improvement comprising:
   a. means for maintaining the specimen stationary; and,
   b. means for scanning the entrance beam and the exit beam to move the small spot over the stationary specimen in the selected plane while the exit beam remains focused to the exit pinhole aperture in a manner that the central axis of such exit beam passes through the objective lens at varying angles with respect to the optical axis, and synchronously therewith, for scanning the beam of radiation focused to the point in the image plane to move such point over such image plane.

8. The improvement recited in claim 7 having additionally beam splitting means for causing the entrance beam and the exit beam to be coincident as each one thereof passes between the scanning means and the stationary specimen.

9. In an incident illumination microscope wherein an entrance beam of illuminating radiation is focused to a small spot in a selected plane of a specimen and an exit beam formed from a portion of the radiation emanating from the small spot is focused to an exit pinhole aperture, the improvement comprising:
   a. means for maintaining the specimen stationary;
   b. means for scanning the entrance beam and the exit beam to move the small spot over the stationary specimen in the selected plane while the exit beam remains focused to the exit pinhole aperture; and
   c. beam splitting means for causing the entrance beam and the exit beam to be coincident as each one thereof passes between the scanning means and the stationary specimen.

10. The improvement recited in claim 9 including additionally a spatial filter disposed at a point along an optical path, such optical path being defined by the path of the entrance beam and the path of the exit beam.

11. In an incident illumination microscope wherein an entrance beam of illuminating radiation is focused to a small spot in a selected plane of a specimen and an exit beam, having a central axis, formed from a portion of the radiation emanating from such small spot, is focused by an objective lens having an optical axis to an exit pinhole aperture, the improvement comprising:
   a. means for maintaining the specimen stationary;

b. means for scanning the entrance beam and the exit beam to move the small spot over the stationary specimen in the selected plane while the exit beam remains focused to the exit pinhole aperture in a manner that the central axis of such exit beam passes through the objective lens at varying angles with respect to the optical axis; and c. beam splitting means for causing the entrance beam and the exit beam to be coincident as each one thereof passes between the scanning means and the specimen.

* * * * *